Figure 1:
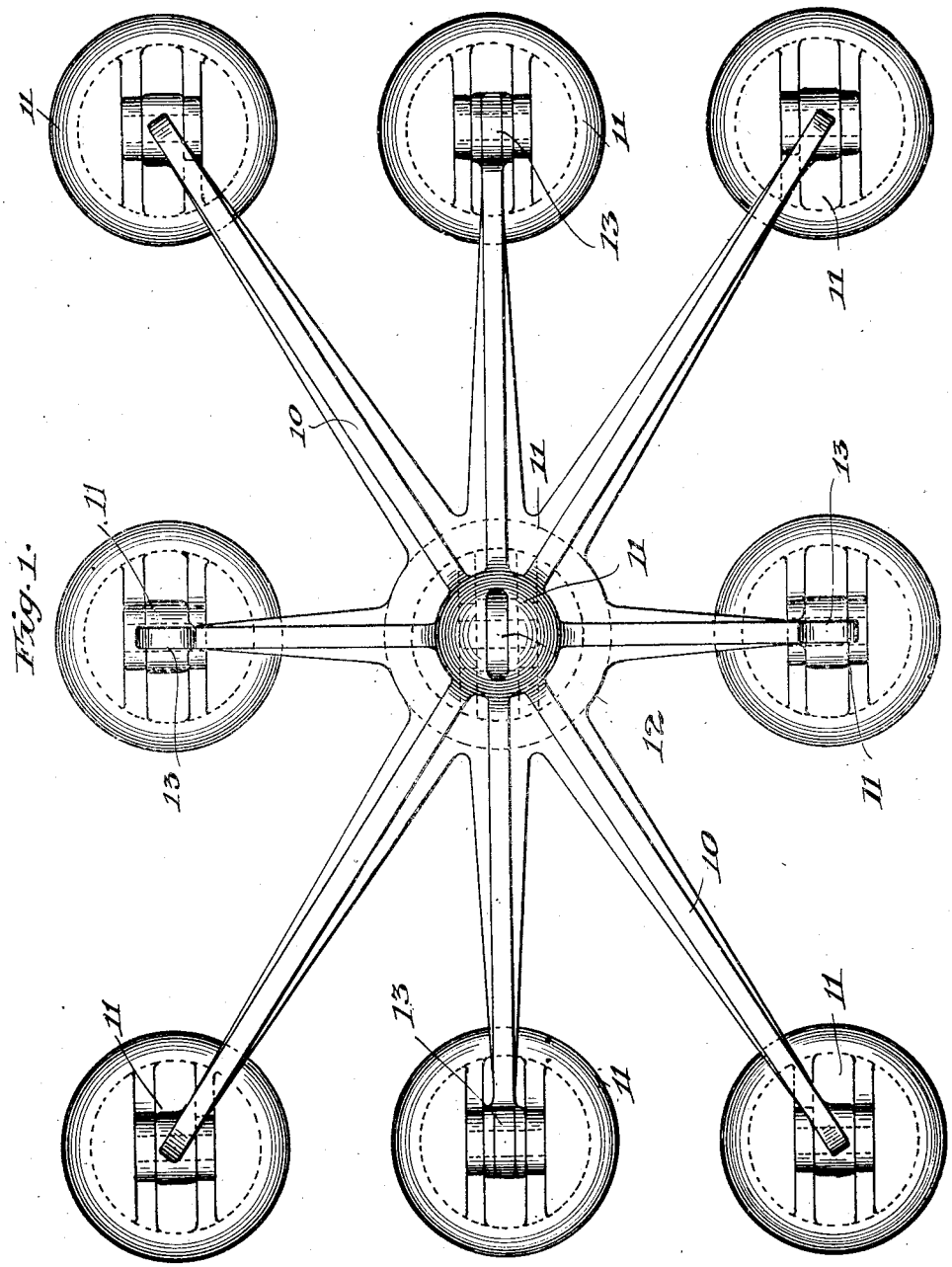

No. 854,153. PATENTED MAY 21, 1907.
E. I. DODDS.
ELECTROMAGNETIC MEANS FOR TRANSPORTING NON-MAGNETIC MATERIALS.
APPLICATION FILED APR. 27, 1906.
3 SHEETS—SHEET 1.

Witnesses,
S. S. Mann
Walter M. Fuller

Inventor,
Ethan I. Dodds
By Offield Towle & Linthicum
Atty's.

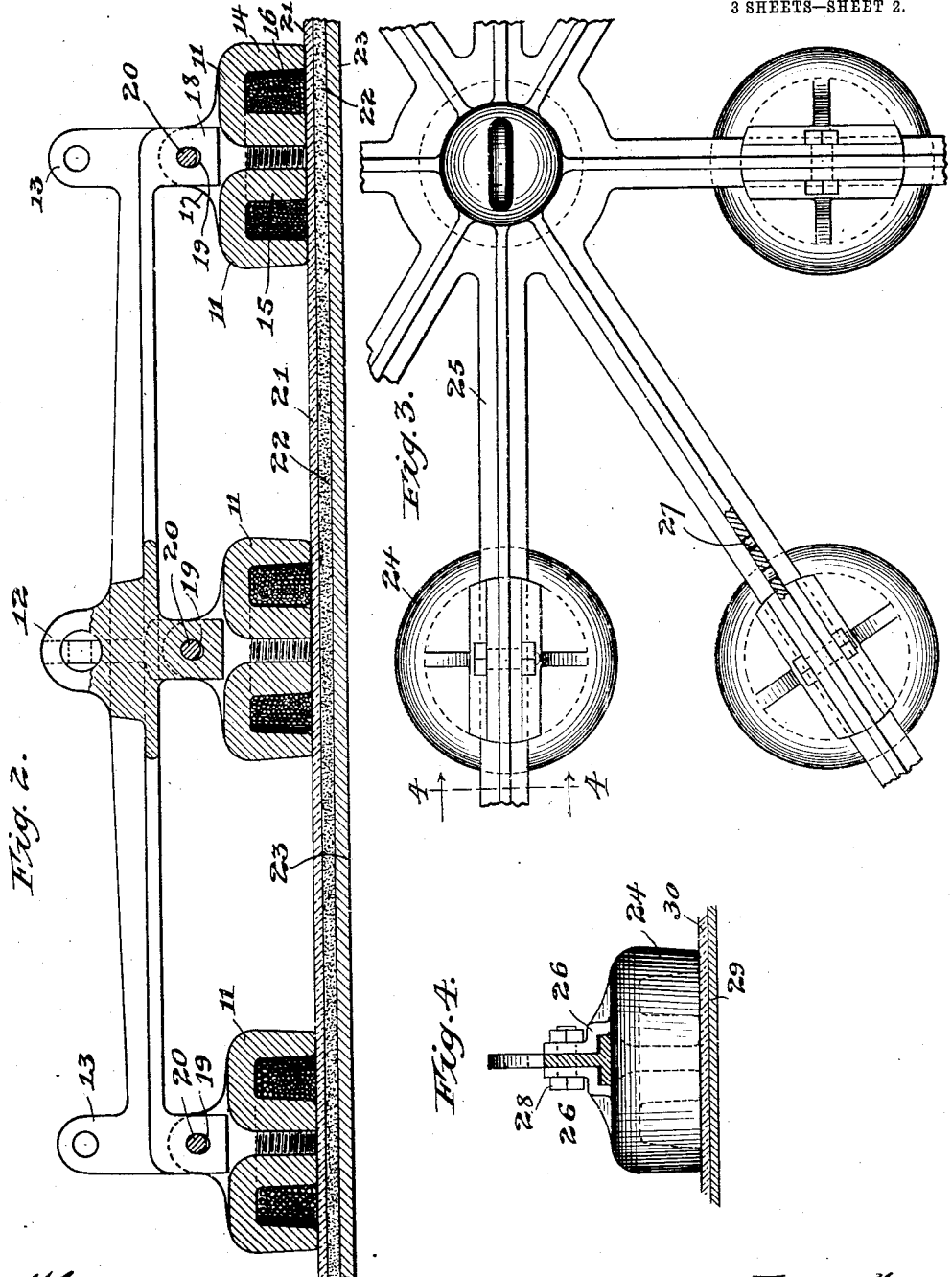

No. 854,153. PATENTED MAY 21, 1907.
E. I. DODDS.
ELECTROMAGNETIC MEANS FOR TRANSPORTING NON-MAGNETIC MATERIALS.
APPLICATION FILED APR. 27, 1906.
3 SHEETS—SHEET 3.
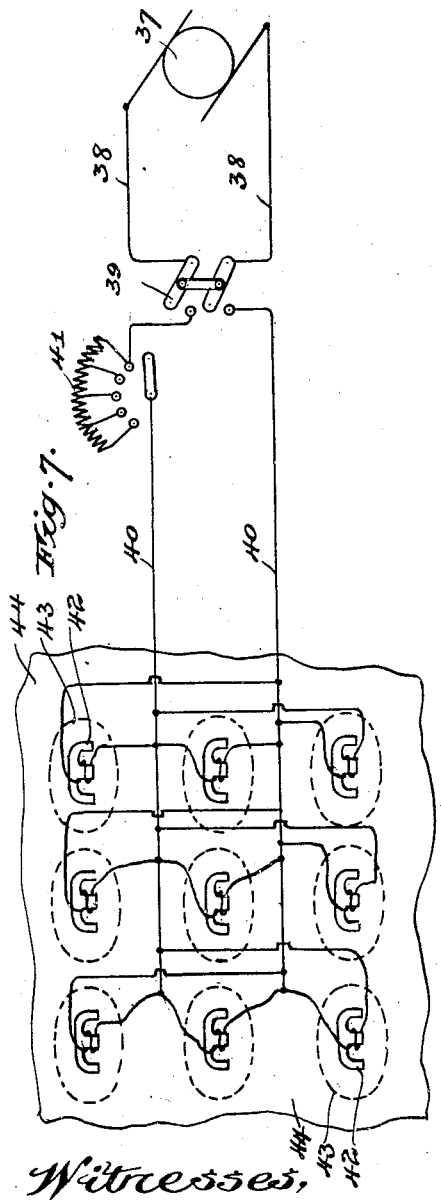
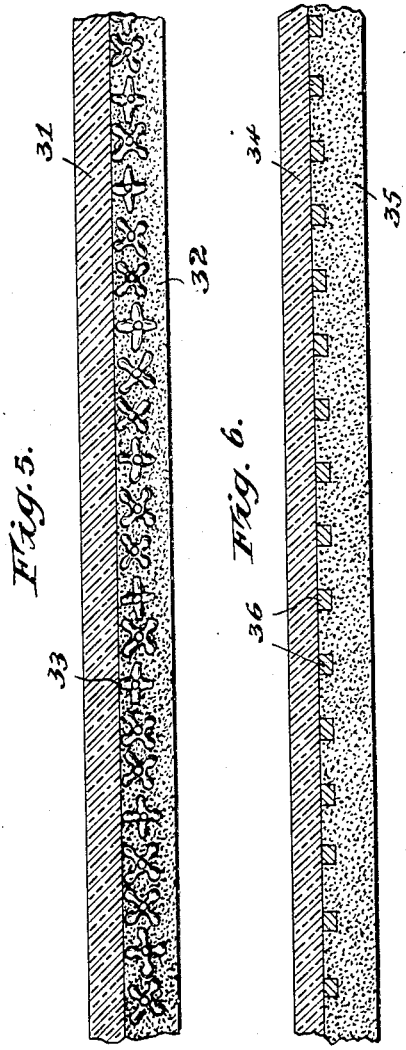
Witnesses:
J. S. Mann
Walter M. Fuller
Inventor,
Ethan I. Dodds
By Offield Towle & Linthicum
Atty's.

UNITED STATES PATENT OFFICE.

ETHAN I. DODDS, OF PULLMAN, ILLINOIS.

ELECTROMAGNETIC MEANS FOR TRANSPORTING NON-MAGNETIC MATERIALS.

No. 854,153.   Specification of Letters Patent.   Patented May 21, 1907.

Application filed April 27, 1906. Serial No. 314,111.

*To all whom it may concern:*

Be it known that I, ETHAN I. DODDS, a citizen of the United States, residing at Pullman, in the county of Cook and State of Illinois, have invented certain new and useful Improvements in Electromagnetic Means for Transporting Non-Magnetic Materials, of which the following is a specification.

My invention pertains to an electro-magnetic mechanism for handling or transporting non-magnetic material or bodies and it is especially directed to improvements in means for conveying glass, either in sheets or in crates or cases, provided the latter are not too thick.

The customary method of handling large sheets or plates of glass is quite crude and the percentage of breakage is too high. Furthermore, before glass can be transported by the usual method, it has to be allowed to become substantially cold, and the present method of handling the glass when it has cooled is to raise the sheet up at one end, work wedges in underneath, eventually place straps beneath the sheet, and with great difficulty the glass is tilted on edge. Then if the sheet is about 30 by 20 feet, it requires fifteen to twenty men to carry the same from one end of the building to the other. About eight to ten men are needed on each side of the sheet and it is absolutely necessary for them to keep step while transporting the sheet of glass. For this purpose, the men frequently whistle or sing to enable them to properly keep step, and even with this precaution, the breakage is great, causing the high prices of plate glass at the present time. Another difficulty in the way of drafts is also encountered, since a comparatively slight current of air striking against the glass renders its transportation difficult, because it acts more or less as a sail to catch the breeze. Consequently, it becomes necessary to be careful to close all the openings in the building in order to safely carry the glass from one position to another.

To overcome these obstacles and reduce the breakage to a minimum, I have invented an electro-magnetic means for handling glass in a horizontal, vertical, or in any other position. The additional advantage of being able to carry the glass while hot, thereby effecting a saving in time, is also secured by my invention.

I am aware that electro-magnets have been used in connection with cranes for manipulating magnetic materials but I believe that I am the first person to use an electro-magnet for handling glass or similar non-magnetic bodies.

Beneath the glass or other material, I place a sheet or one or more pieces of magnetic material, and above the glass I provide one or more magnets, preferably electro-magnets, manipulated and controlled by a crane, derrick, hoist or the like. The pull on or attraction for the metal beneath the glass constituting the armature or armatures by the magnets causes the armature to support the glass, thereby permitting it to be transported by the crane. I prefer to use a plurality of adjustable magnets for this purpose and, by rendering the magnetism sufficiently strong, boxes or crates of glass or similar non-magnetic material may be conveyed safely and expeditiously from one place to another.

In the accompanying drawings, I have illustrated the details of my invention and in the various figures like reference characters refer to the same parts throughout.

Figure 1 is a plan view of a spider equipped with a number of electro-magnets, the device being suitable for use in transporting sheets of plate glass; Fig. 2 is a section of three of the magnets shown in Fig. 1 and illustrates the internal construction of the same; Fig. 3 shows a modified form of multiple electro-magnet in which the magnets are adjustable longitudinally of the spider arms; Fig. 4 is a cross-section on the line 4—4 of Fig. 3; Fig. 5 shows a sheet of glass resting upon a bed of sand in which are embedded a number of jacks; Fig. 6 is a similar view, showing a sheet of glass resting on a bed of sand containing metal strips; and Fig. 7 is a diagrammatic view of the circuit connections between the generator and the plurality of magnets.

Referring first to Fig. 1, it will be seen that I have provided a spider 10 having a number of outwardly extended arms to the ends of which are attached the electro-magnets 11. At the center of the top of the spider, there is provided an eye or loop 12 to afford connection for the hook or chain of a crane, derrick or the like. The spider also has rings or eyes 13 at the opposite ends of the central transverse arm of the spider so that the magnet and its supported parts may be carried on edge.

As is illustrated in Fig. 2, it will be seen that each magnet 11 consists of an outer marginal circular rim 14 and a central core 15, the spool or coil of wire 16 of the magnet being interposed between the rim and core, as shown. On its top each magnet has two upstanding perforated lugs 17, between which extends an arm 18 projecting from the spider arm, the arm 18 being slotted as at 19 to accommodate a pin or bolt 20 which passes therethrough and also through the perforations of lugs 17. It will be seen that this form of connection allows the magnet to have more or less play to compensate for inequalities or irregularities on the surface of the glass 21. As illustrated in Fig. 2, the sheet of glass is resting upon a layer of plaster of paris 22, which acts as its bed, while the glass is being ground down or polished. Beneath the strata of plaster of paris is a metallic plate 23, adapted to act as a common armature for all of the magnets 11.

The construction illustrated in Figs. 3 and 4 is similar to that shown in Figs. 1 and 2 but differs therefrom in that the magnets 24 are adjustable longitudinally of the spider arms 25. Each of these arms is T-shape in cross-section, as shown in Fig. 4, and each of the magnets has a pair of upwardly extended bent arms 26, which are adapted to clasp the spider arm above its oppositely extended flanges. Each arm 25 has a number of apertures 27 through its web and a bolt 28 may be passed through a hole in the bent arms 26 and the spider arm 25, whereby each magnet may be placed in a number of adjusted positions, depending upon the size of the sheet of glass to be acted upon.

In Fig. 4 I have illustrated the metal armature 29 as being directly below the sheet of glass 30, but it will be readily understood that the operation of this electro-magnetic conveyer or crane is the same in all of the modifications illustrated.

I have shown in Fig. 5 a plate of glass 31 resting upon a bed of sand 32, while it is being polished, and in this body of sand are embedded a number of metallic magnetic jacks 33. When the magnet or magnets are placed above the sheet of glass and the current of electricity applied, the jacks are attracted and support the glass as the magnets are moved away, carrying the jacks and glass with them.

In Fig. 6 there is illustrated a similar sheet of glass 34, a bed of sand 35 and embedded metallic bars or strips 36 which act in the same manner as the jacks shown in Fig. 5.

The diagram of connections for the magnets is illustrated in Fig. 7, the current passing from the generator or dynamo 37 through the mains 38 to a hand-switch 39 and from the latter to the conductors 40 through an adjustable resistance or rheostat 41. The various magnets 42 are connected in parallel or multiple arc relation with the conductors 40 and in this particular figure I have shown each magnet provided with a separate armature 43, placed beneath a sheet of glass or crate of glass 44.

It will be apparent to those skilled in the art that various mechanical changes may be made in the structure illustrated and described without departing from the substance of my invention, which involves broadly the method of transporting sheets or bodies of non-magnetic material by electro-magnetic means.

I claim:

1. The method of supporting a body of non-magnetic material, which consists in resting said body upon an armature and sustaining the latter by the pull exerted thereon by an electro-magnet, substantially as described.

2. The method of supporting a body of non-magnetic material, which consists in resting the same upon an armature placed beneath said body, said armature being sustained by the attraction exerted thereon by an electro-magnet, the lines of force passing through said non-magnetic body, substantially as described.

3. The method of supporting a body of non-magnetic material, which consists in placing an armature on one side of said body, and an electro-magnet on the opposite side, the attraction of said magnet for said armature pressing the parts together sufficiently to sustain said body in any position, substantially as described.

4. The method of transporting a sheet of glass, which consists in resting said sheet upon an armature, sustaining the latter by the attraction of an electro-magnet therefor, and then moving said magnet and supported parts to the location desired, substantially as described.

5. The method of transporting a sheet of glass, which consists in placing an armature on one side of said sheet and a plurality of electro-magnets on the opposite side of said sheet, the attraction of said magnets for said armature pressing the parts together sufficiently to sustain said sheet in any position, and moving said magnets, armature, and sheet of glass to the location desired, substantially as described.

ETHAN I. DODDS.

Witnesses:
 FREDERICK C. GOODWIN,
 WALTER M. FULLER.